United States Patent
Khosla et al.

(10) Patent No.: US 8,165,407 B1
(45) Date of Patent: Apr. 24, 2012

(54) VISUAL ATTENTION AND OBJECT RECOGNITION SYSTEM

(75) Inventors: Deepak Khosla, Camarillo, CA (US); Christopher Kanan, La Jolla, CA (US); David Huber, Venice, CA (US); Suhas Chelian, Los Angeles, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1237 days.

(21) Appl. No.: 11/973,161

(22) Filed: Oct. 4, 2007

Related U.S. Application Data

(60) Provisional application No. 60/849,975, filed on Oct. 6, 2006, provisional application No. 60/903,241, filed on Feb. 23, 2007.

(51) Int. Cl.
  *G06K 9/62* (2006.01)
  *G06K 9/00* (2006.01)

(52) U.S. Cl. .......................... 382/224; 382/164; 382/165

(58) Field of Classification Search .................. None
  See application file for complete search history.

(56) References Cited

U.S. PATENT DOCUMENTS

| | | | |
|---|---|---|---|
| 6,670,963 B2 | 12/2003 | Osberger | |
| 7,680,295 B2 * | 3/2010 | Yoda et al. | 382/100 |
| 2004/0036923 A1 * | 2/2004 | Kokemohr et al. | 358/3.27 |
| 2005/0047647 A1 | 3/2005 | Rutishauser et al. | |
| 2007/0173699 A1 | 7/2007 | Mathan et al. | |
| 2007/0236488 A1 | 10/2007 | Mathan et al. | |
| 2008/0056611 A1 | 3/2008 | Mathan et al. | |
| 2009/0310821 A1 * | 12/2009 | Connell, II | 382/103 |

FOREIGN PATENT DOCUMENTS

| | | | |
|---|---|---|---|
| WO | WO 03-025859 A1 * | 3/2003 | |
| WO | WO 03/093947 | 11/2003 | |

OTHER PUBLICATIONS

Walther et al. (Jun. 2005) "Selective visual attention enables learning and recognition of multiple objects in cluttered scenes." Computer Vision and Image Understanding, vol. 100 pp. 41-63.*

Lowe, D.G. (Nov. 2004) "Distinctive image features from scale-invariant keypoints." Int'l J. Computer Vision, vol. 60 No. 2, pp. 91-110.*

Siagian et al. (Jun. 2005) "Gist: A mobile robotics application of context-based vision in outdoor environment." Proc. 2005 IEEE Comp. Sci. Conf. on Computer Vision and Pattern Recognition, pp. 88+.*

(Continued)

*Primary Examiner* — Bhavesh Mehta
*Assistant Examiner* — Barry Drennan
(74) *Attorney, Agent, or Firm* — Tope-McKay & Assoc.

(57) ABSTRACT

Described is a bio-inspired vision system for object recognition. The system comprises an attention module, an object recognition module, and an online labeling module. The attention module is configured to receive an image representing a scene and find and extract an object from the image. The attention module is also configured to generate feature vectors corresponding to color, intensity, and orientation information within the extracted object. The object recognition module is configured to receive the extracted object and the feature vectors and associate a label with the extracted object. Finally, the online labeling module is configured to alert a user if the extracted object is an unknown object so that it can be labeled.

9 Claims, 10 Drawing Sheets

OTHER PUBLICATIONS

Ng et al. (Jun. 2006) "Medical image segmentation using k-means clustering and improved watershed algorithm." Proc. 2006 IEEE Southwest Symp. on Image Analysis and Interpretation, pp. 61-65.*

Fussenegger et al. (Aug. 2004) "Object recognition using segmentation for feature detection." Proc. 17th IEEE Int'l Conf. on Pattern Recognition, vol. 3 pp. 41-44.*

Khosla, D. (Sep. 2006) "Biologically-inspired cognitive architecture for integrated learning, action and perception (BICA-LEAP)." HRL Laboratories, LLC. DARPA/IPTO Final Report N00014-05-C-0510.*

A. Berg, "Shape matching and object recognition," Ph.D. thesis, UC Berkeley, Computer Science Division, Berkeley, CA, Dec. 2005.

A. Andoni and P. Indyk, "Near-Optimal Hashing Algorithms for Near Neighbor Problem in High Dimensions," Proceedings of the Symposium on Foundations of Computer Science (FOCS'06), 2006.

G.A. Carpenter, et al., "A massively parallel architecture for a self-organizing neural pattern recognition machine," Computer Vision, Graphics, and Image Processing, 37, 54-115, 1987.

G.A. Carpenter, et al., "The what-and-where filter a spatial mapping neural network for object recognition and image understanding," Computer Vision and Image Understanding, 69, 1-22, 1998.

G.A. Carpenter, "Default ARTMAP," in Proc. Of the International Joint Conference on Neural Networks (IJCNN'03), 1396-1401, 2003.

G.A. Carpenter, et al., "Self-organizing information fusion and hierarchical knowledge discovery: a new framework using ARTMAP neural networks," Neural Networks, 18, 287-295, 2005.

B. Draper, at al., "Evaluation of Selective Attention under Similarity Transforms," In Workshop on Performance and attention in computer vision, Graz, Austria, Apr. 2003.

R. Eckhorn, et al., "Coherent Oscillations: A Mechanism of feature linking in the visual cortex?" Biological Cybernetics 60, 121-130, 1988.

D.J. Field, "Relations between the statistics of natural images and the response properties of cortical cells," J. Opt. Soc. Am. A., 4: 2379-2394, 1987.

L. Fei-Fei, et al., "Learning generative visual models from few training examples: an incremental Bayesian approach tested on 101 object categories," CVPR 2004, Workshop on Generative-Model Based Vision, 2004.

C.M. Gray, et al., "Oscillatory Responses in Cat visual cortex exhibit intercolumnar synchronization which reflects global stimulus properties," Nature 338: 334-336, 1989.

L. Itti, et al., "A saliency-based search mechanism for overt and covert shifts of visual attention," Vision Research, 40: 1489-1506, 2000.

L. Itti, et al., "A model of saliency-based visual attention for rapid scene analysis," IEEE Transactions on pattern analysis and machine intelligence, 20, 1254-1259, 1998.

C. Koch, et al., "Shifts in selective visual attention: towards the underlying neural circuitry," Human Neurobiology, 4: 219-227, 1985.

S. Lazebnik, et al., "Beyond Bags of Features: spatial pyramid matching for recognizing natural scene categories," In: Proc. IEEE Conference on Computer Vision and Pattern Recognition (CVPR), 2006.

V. Navalpakkam, at al., Sharing resources: buy attention, get recognition, In: Proc. International Workshop on Attention and Performance in Computer Vision (WAPCV'03), Graz, Austria, Jul. 2003.

V. Navalpakkam, at al., "An integrated model of top-down and bottom-up attention for optimal object detection," In: Proc. IEEE Conference on Computer Vision and Pattern Recognition (CVPR), 1-7, 2006.

E. Niebur, at al., "Control of selective visual attention: modeling the 'where' pathway," In. D. Touretzky, M Mozer and M. Hasselmo. Neural Imformation Processing Systems (NIPS 8), 802-808, Cambridge, MA, MIT, Press 1996.

F. Orabona, et al., "Object-based visual attention: a model for a behaving robot," In 3rd International Workshop on Attention and Performance in Computational Vision (in CVPR 2005), San Diego, CA, Jun. 2005.

B.J. Scholl, "Objects and Attention: the state of the art," Cognition 80, 1-46, 2001.

T. Serre, et al., "Object recognition with features inspired by visual cortex," in Proceedings of the IEEE conference on computer vision and pattern recognition (CVPR), San Diego, CA, Jun. 2005.

Y. Sun, et al., "Hierarchical selectivity for object-based visual attention," Submitted to Artificial Intelligence, 2004.

J.M. Wolfe, "Visual Search in continuous, naturalistic stimuli," Vision Research 34: 1187-1195, 1994.

H. Zhang, et al., "SVM-KNN: Discriminative nearest neighbor classification for visual category recognition," CVPR 2006.

Navalpakkam V., et al., "Sharing resources: buy attention, get recognition," In: Proc. International Workshop on Attention and Performance in Computer Vision (WAPCV'03), Graz, Austria, Jul. 2003.

Bentin, S., et al., "Electrophysiological studies of face perception in humans," Journal of Cognitive Neuroscience, 8, 551-565, 1996.

Richard P. Wildes, "A measure of motion salience for surveillance applications" in Proc. IEEE Int'l Conf. Image Processing,1998.

Berka, C., et al., "Evaluation of an EEG-workload model in an aegis simulation environment" in Proceedings of SPIE Defense and Security Symposium, 90-99, 2005.

Bhattacharyya, R., et al., "Optimal image ordering for rapid serial visual presentation using electroencephalography," Presented at Society of NeuroScience (SfN) annual meeting, Chicago, 2009.

Yamaguchi, S., et al., "Cerebral Asymmetry of the 'Top-down' allocation of attention to global and local features," The Journal of Neuroscience, 20, 1-5, 2000.

http://en.wikipedia.org/Travelling_salesman_problem.

Vogel, E.K., et al., "The Visual NI Component as an index of a discrimination process," Psychophysiology, 2000.

Vazirani, V., "Approximation Algorithms," Springer-Verlag, Berlin, Germany. pp. 32-33 (2004).

Cowell, et al., "Construction and validation of neurophysio-technological framework for imagery analysis," in J.Jacke (Ed.): Human-Computer Interaction, Part II, HCII 2007, LNCS 4551, pp. 1096-1105, 2007, © Springer-Verlag Berlin Heidelberg.

Navalpakkam, V, et al., "Search goal tunes visual features optimally," Neuron, 53, 605-617, 2007.

Walther D., et al, "Attentional selection for object recognition—a gentle way," Lecture Notes in Computer Science 2525: 472-479, 2002.

Eimer, M., "Does the face-specific N170 component reflect the activity of a specialized eye processor?" Neuroreport, 9, 2945-2948, 1998.

Fabre-Thorpe, M., et al., "A limit to the speed of processing in Ultra-Rapid visual categorization of novel natural scenes," Journal of Cognitive Neuroscience, 13, 171-180, 2001.

University of California, San Diego Complex Systems and Cognition Laboratory, CSCLAB Image Database http://csclab.ucsd.edu/labeledimages.php. 2006.

Thorpe, S., et al., "Speed of processing in the human visual system," Nature, vol. 381, pp. 520-522, 1996.

Gerson, A.D., et al., "Cortically coupled computer vision for rapid image search," IEEE Transactions on Neural Systems and Rehabilitation Engineering, 14(2): 174-179, Jun. 2006.

Gladwell, M., "Blink: the power of thinking without thinking," 1st ed. Little, brown and company: Time Warner Book Group, New York, 2005, pp. 18-47.

Gutin, G., et al., "Traveling salesman should not be greedy: domination of analysis of greedy-type heuristics for the TSP," Discrete Applied Mathematics, 117: 81-86, 2002.

Sun, Y., et al., "Probabilistic judgment by a coarser scale: behavioral and ERP evidence," in Proceedings of the Twenty-sixth Annual meeting of the Cognitive Science Society, 2004.

Hopf, J.-M., et al., "Localizing visual discrimination processes in time and space," The American Physiological Society, 88, 2088-2095, 2002.

Smeulders, A., et al., "Content-based image retrieval at the end of the early years," IEEE Transactions on PAMI, 22(12): 1349-1380, 2000.

Rogowitz, B.E., et al., "Perceptual image similarity experiments," Proceedings of SPIE, 3299: 576-590, 1998.

Itti L., et al., "Bayesian Surprise Attracts Human Attention," Vision Research 49: 1295-1306, 2008.

Itti, L., et al., "Computational Modeling of Visual Attention," Nature Reviews Neuroscience, 2, 194-203, 2001.

Itti, L., "Quantifying the Contribution of low-level saliency to human eye movements in dynamic scenes," Visual Cognition, 12, 1093-1123, 2005.

Keysers, C., et al., "The Speed of Sight," Journal of Cognitive Neuroscience, 13 (1), 90-101, 2001.

Khosla D., et al., "Bio-Inspired Visual Attention and Object Recognition," In: Proc. SPIE Defense, Security, and Sensing, 6560, 656003, 2007.

Khosla, D., et al., "A bio-inspired system for spatio-temporal recognition in static and video imagery," Proc. SPIE 6560, 656002, 2007.

Peters, R.J., et al, "Beyond bottom-up: Incorporating task-dependent influences into computational model of spatial attention," in: Proc. IEEE Conference on Computer Vision and Pattern Recognition (CVPR), 2007.

Owechko, Y., et al., "Cognitive swarms for rapid detection of objects and associations in visual imagery," IEEE Swarm Intelligence Symposium, 2005.

Ling, H., et al., "Diffusion distance for histogram comparison," IEEE Computer Society Conference on Computer Vision and Pattern Recognition (CVPR), 2006.

Medasani, S., et al., "Possibilistic particle swarms for optimization," Proceedings 5673 of SPIE/IST Symposium on Electronic Imaging, 2005.

Medasani, S., et al., "Active learning system for object fingerprinting," International Joint Conference on Neural Networks, 2004.

Morrison, D., et al., "Semantic clustering of images using patterns of relevance feedback," in Proceedings of the 6th International Workshop on Content-based Multimedia Indexing (CBMI 2008), London, UK.

Nane S.A., et al., "Columbia Object Image Library (COIL-100)," Technical Report CUCS-006-96, Feb. 1996.

Navalpakkam V., et al., Modeling the Influence of Task on Attention. Vision Research, 45: 205-231, 2005.

Owechko, Y., et al., "A swarm-based volition/attention framework for object recognition," IEEE Conference on Computer Vision and Pattern Recognition, San Diego, 2005.

* cited by examiner

| Category | Accuracy |
|---|---|
| Faces | 100% |
| Motorbikes | 100% |
| Car Side | 100% |
| Rooster | 94% |
| Revolver | 92% |
| Saxophone | 92% |
| Dollar Bill | 89% |
| Inline Skate | 88% |
| Menorah | 88% |
| Windsor Chair | 88% |

FIG. 10

VISUAL ATTENTION AND OBJECT RECOGNITION SYSTEM

PRIORITY CLAIM

The present application is a non-provisional patent application, claiming the benefit of priority of U.S. Provisional Application No. 60/849,975, filed on Oct. 6, 2006, entitled, "A Bio-Inspired Vision System for Object Recognition," and also claiming the benefit of priority of U.S. Provisional Application No. 60/903,241, filed on Feb. 23, 2007, entitled, "A Bio-Inspired Vision System for Object Recognition."

FIELD OF INVENTION

The present invention relates to an object recognition system, and more specifically, to a bio-inspired vision system that can (1) learn representations of objects that are invariant to scale, position, and orientation; and (2) recognize and locate these objects in static and video imagery.

BACKGROUND OF INVENTION

When a person enters a room that the person has never seen before, the person's visual system immediately begins to parse the scene. The eyes move (saccade) to regions of the room that contain objects of interest, and as these objects are found, the brain immediately begins classifying them. If the person sees something new and unrecognized, the person might ask a friend what the item is called. While this task is trivial for most humans to accomplish, it has proven to be a very challenging problem to get computers to perform well. Because human performance far exceeds that of the best machine vision systems to date; building an artificial system inspired by the principles underlying human vision has been an attractive idea since the field of computer vision was conceived. However, most of the bio-inspired systems only incorporate one aspect of vision, have not been robustly tested on real-world image datasets, and/or are not suited for real-time applications. The majority of research in machine vision has dealt with individual problems, such as recognizing or segmenting objects from a scene. Much less work has been done in ascertaining the best way to combine various vision algorithms.

Recently, numerous groups have constructed object recognition algorithms capable of accurately classifying over 100 distinct object categories in real-world image datasets. Much of this work has been tested using the Caltech-101 dataset, which consists of 101 classes of objects, each containing many images (see literature reference no. 1, below in the Detailed Description). This is a very hard dataset to get good performance on. Because each class contains a variable number of images, the standard procedure in reporting results with this dataset is to calculate the average performance for each class and then calculate the mean accuracy. A failure to do so gives results that are overly-optimistic because some of the easier classes contain more images than some of the harder ones. All of the results on this dataset are determined in this manner.

One of the best non-biologically inspired systems, developed by Berg, achieves 48 percent accuracy on the Caltech-101 dataset using fifteen training images per class and normalizing the results (see literature reference no. 2). Berg's method represents shape by sampling 400 pixel locations from the output of an edge detecting algorithm, which are chosen because they have "high edge energy." The algorithm then uses geometric blur to determine corresponding points on two shapes, and a custom classifier that uses binary quadratic optimization to obtain a correspondence between an input and data stored in the classifier.

Lazebnik et al. achieved excellent results on the Caltech-101 dataset using spatial pyramid matching kernels (see literature reference no. 3). They attained 56.4 percent also using fifteen images per class. Their algorithm uses scale invariant feature transform (SIFT) descriptors as features that are fed into a spatial pyramid matching kernel (see literature reference no. 4). This kernel allows for precise matching between two collections of features in a high dimensional space, while preserving some spatial information. Support vector machines (SVMs) are then used for classification (see literature reference no. 5).

Hierarchical Model and X (HMAX) is the foremost bio-inspired visual feature extraction architecture (see literature reference nos. 6 through 9). It has been primarily used in conjunction with a SVM classifier on the Caltech-101 dataset. This model is based on studies of visual receptive fields found in cat and monkey visual cortex. One of the best implementations of HMAX achieves $51.2 \pm 1.2$ percent accuracy when using fifteen images (see literature reference no. 9). While these results are good, they are currently too slow for real-time applications (see literature reference no. 8).

While each of the object recognition algorithms discussed above can only deal with images containing a single object, visual attention algorithms attempt to find interesting areas in a scene, which could contain many objects. Most of the visual attention algorithms that have been developed are feature-based (see literature reference nos. 10 and 11). These systems compute attention using a feature-based approach in which attended regions are determined by constructing a saliency map. Attention is paid to a series of specific locations in a visual scene as if a spotlight has been shined on particular regions in the image. The spotlight is nonspecific and can illuminate an object, a part of an object, a texture or lighting artifact, or nothing at all. Most feature-based methods cannot segment attended objects from the background. Also, in some of these algorithms, the attended regions have been shown to be variant under both translation and rotation of the scene (see literature reference no 12). This is an undesirable trait of a biologically inspired attention mechanism, since it makes little sense that the visual attention of a living creature would change dramatically when it tilts its head. Many of these problems could be eliminated by adopting an object based visual attention algorithm.

Other systems have been developed that integrate attention and object recognition. The Navalpakkam and Itti system can find objects in a visual scene, and for object recognition it constructs a hierarchical tree that stores features (see literature reference nos. 13 and 14). When a new feature is to be classified, their system searches this tree for the closest matching feature. This approach does not take shape directly into account, which may be vital to successfully classifying an object. Additionally, it is unclear how well their system will scale when it needs to distinguish among a large number of object classes.

Thus, a continuing need exists for a Visual Attention and Object Recognition System (VARS), which combines the ability to find objects in a scene with the power to accurately classify those objects and, which can be configured to request the correct identify of an object it is unfamiliar with.

SUMMARY OF INVENTION

The present invention relates to a bio-inspired vision system for object recognition. The system includes an Attention Module, an Object Recognition Module, and an Online Learning Module. The Attention Module is configured to receive an image representing a scene with an object in the scene and find and extract the object from the image as an extracted object. The Attention Module is also configured to generate feature vectors corresponding to color, intensity, and orientation information within the extracted object.

The Object Recognition Module is configured to receive the extracted object and the feature vectors and associate a label with the extracted object to classify the object. The Object Recognition Module is also configured to generate a confidence value reflective of an accuracy of the classification of the object.

Additionally, the Online Labeling Module is configured to alert a user if the extracted object is an unknown object and prompt the user to input a label for the unknown object. The Online Labeling Module classifies the object as an unknown object if the confidence value is below a predetermined threshold.

In another aspect, the Attention Module is further configured to convert a black and white image into a red/green/blue (RGB) color format image.

In yet another aspect, the Attention Module is further configured to receive an image (having color features) that includes a representation of an object in a scene. Color intensity is then to the color features to generate an intensity gradient. The scene is then segmented into a series of "proto-objects" based on the intensity gradient. Boundaries of the proto-objects are defined by common features between immediate regions within the image. A saliency is computed of a given proto-object using color and intensity information contained within the image. The proto-objects are then ranked according to saliency. The proto-object with the highest saliency is then designated as the object to be extracted from the image. Finally, the object is extracted from the image.

In another aspect, the object recognition module is further configured to reformat (rotate and rescale) the object to an invariant representation utilizing a filter. Simple shape features are then extracted from the image utilizing a Log-Gabor filter. High-level features are then extracted from the simple shape features utilizing a spatial pyramid matching technique. A course classification is then performed utilizing a k-Nearest Neighbor technique. A fine classification is performed to generate an object label utilizing a Support Vector Machine. Additionally, the object label is then output.

Finally, as can be appreciated by one skilled in the art, the present invention also comprises a method and computer program product. The method comprising acts of performing the operations described herein, with the computer program product comprising instructing means for causing a computer to perform the operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 10 is a table showing the top ten best classified classes using a dataset when trained with fifteen images per class.

DETAILED DESCRIPTION

Figure 1:
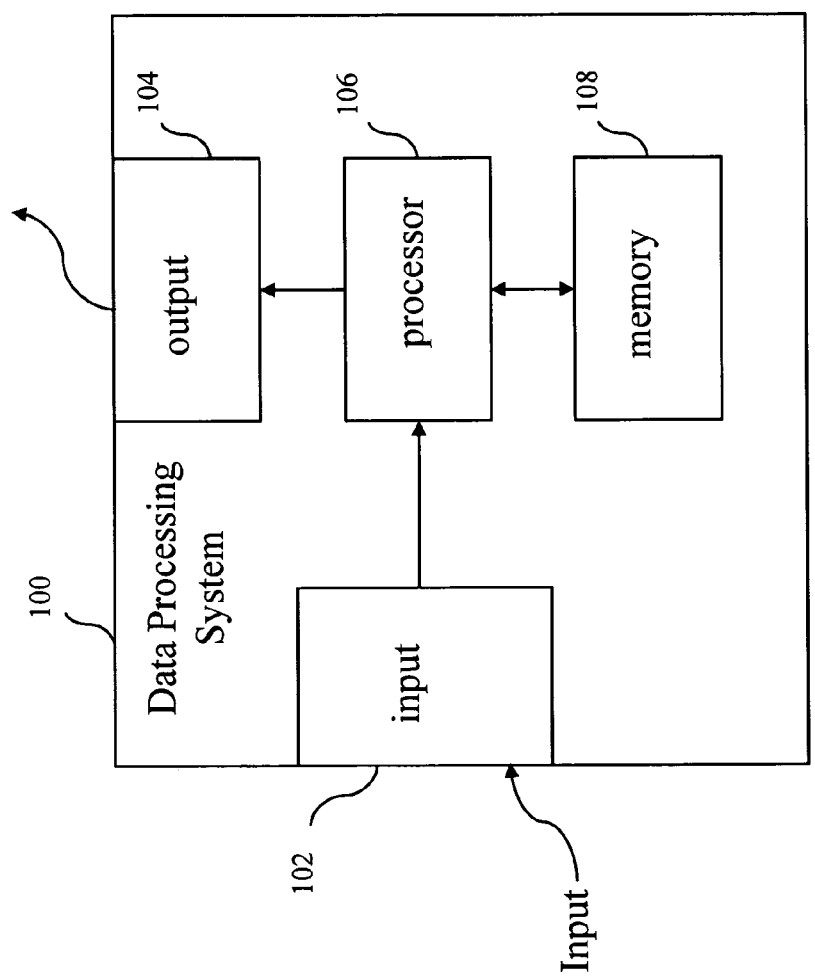
FIG. 1 is a block diagram illustrating components of a vision system according to the present invention.

The present invention relates to an object recognition system and, more specifically, to a bio-inspired vision system that can (1) learn representations of objects that are invariant to scale, position, and orientation; and (2) recognize and locate these objects in static and video imagery. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Following the list of cited references, a description of various principal aspects of the present invention is provided. Subsequently, an introduction provides the reader with a general understanding of the present invention. Next, details of the present invention are provided to give an understanding of the specific aspects. Additionally, experimental results are presented to demonstrate the efficacy of the present invention. Finally, a conclusion is provided as a synopsis of the present invention.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. L. Fei-Fei, R. Fergus, and P. Perona, "Learning generative visual models from few training examples: an incremental Bayesian approach tested on 101 object categories," in the *Proceedings of the Institute of Electrical and Electronics Engineers (IEEE) Conference on Computer Vision and Pattern Recognition (CVPR)*, 2004.
2. A. Berg, "Shape matching and object recognition," Berkeley, Calif., 2005.
3. S. Lazebnik, C. Schmid, and J. Ponce, "Beyond Bags of Features: Spatial Pyramid Matching for Recognizing Natural Scene Categories," in *Proc. IEEE CVPR*, 2006.
4. D. G. Lowe, "Object recognition from local scale-invariant features," in the *International Conference on Computer Vision (ICCV)*, pp. 1150-1157, 1999.
5. C. Cortes and V. Vapnik, "Support-vector networks," *Machine Learning* 20, pp. 273-297, 1995.
6. M. Riesenhuber and T. Poggio, "Hierarchical models of object recognition in cortex," *Nature Neuroscience*. 2, pp. 1019-1025, 1999.
7. T. Serre, L. Wolf, and T. Poggio, "Object Recognition with Features Inspired by Visual Cortex," in *Proc. IEEE CVPR*, 2005.
8. T. Serre, L. Wolf, S. Bileschi, M. Riesenhuber, and T. Poggio, "Robust Object Recognition with Cortex-Like Mechanisms," *IEEE Transactions on Pattern Analysis and Machine Intelligence*. 29, pp. 411-426, 2007.
9. L. Wolf, S. Bileschi, and E. Meyers, "Perception Strategies in Hierarchical Vision Systems," in *Proc. IEEE CVPR*, 2006.
10. L. Itti and C. Koch, "A saliency-based search mechanism for overt and covert shifts of visual attention," *Vision Research*. 40, pp. 1489-1506, 2000.
11. L. Itti and C. Koch, "Computational Modeling of Visual Attention," *Nature Reviews Neuroscience*. 2, pp. 194-203, 2001.
12. B. Draper and A. Lionelle, "Evaluation of Selective Attention under Similarity Transforms," in *Proc. International Workshop on Attention and Performance in Computer Vision (WAPCV'03)*, Graz, Austria, 2003.
13. V. Navalpakkam and L. Itti, "Sharing Resources: Buy Attention, Get Recognition," in *Proc. WAPCV'03*, Graz, Austria, 2003.
14. V. Navalpakkam and L. Itti, "An integrated model of top-down and bottom-up attention for optimal object detection," in *Proc. IEEE CVPR*, 2006.
15. B. J. Scholl, "Objects and Attention: The State of the Art," *Cognition*. 80, pp. 1-46, 2001.
16. F. Orabona, G. Metta, and G. Sandini, "Object-based Visual Attention: A Model for a Behaving Robot," in *Proc. IEEE CVPR*, 2005.
17. G. A. Carpenter, S. Grossberg, and G. Lesher, "The what-and-where filter a spatial mapping neural network for object recognition and image understanding," *Computer Vision and Image Understanding*. 69, pp. 1-22, 1998.
18. D. J. Field, "Relations between the statistics of natural images and the response properties of cortical cells," *J. Opt. Soc. Am. A*. 4, pp. 2379-2394, 1987.
19. B. W. Mel, "SEEMORE: combining color, shape, and texture histogramming in a neurally inspired approach to visual object recognition," *Neural Computation*. 9, pp. 777-804, 1997.
20. K. Grill-Spector and N. Kanwisher, "Visual recognition. As soon as you know it is there, you know what it is" *Psychological Science*. 16, pp. 152-160, 2005.
21. T. Palmeri and I. Gauthier, "Visual Object Understanding," *Nature Reviews Neuroscience*. 5, 2004.
22. D. Boussaoud, R. Desimone, and L. Ungerleider, "Visual topography of area TEO in the macaque," *The Journal of Comparative Neurology*. 206, pp. 554-575, 1991.
23. T. Clover and P. Hart, "Nearest neighbor pattern classification," *IEEE Transactions on Information Theory*. 13, pp. 21-27, 1967.
24. S. A. Nene, S. K. Nayar, and H. Murase, "Columbia Object Image Library (COIL-100)," Technical Report No. CUCS-006-96, dept. Comp. Science, Columbia University, 1996.
25. D. Roobaert and M. V. Hulle, "View-Based 3D Object Recognition with Support Vector Machines," in *Proc. of the IEEE Workshop on Neural Networks for Signal Processing (NNSP99)*, Madison, Wis., 1999.
26. H. Murase and S. Nayer, "Visual Learning and Recognition of 3-D Objects from Appearance," *Int. Journal of Computer Vision*. 14, pp. 5-24, 1995.
27. H. Zhang, A. Berg, M. Maire, and J. Malik, "SVM-KNN: Discriminative Nearest Neighbor Classification for Visual Category Recognition," in *Proc. IEEE CVPR*, 2006.
28. G. A. Carpenter and S. Grossberg, "A massively parallel architecture for a self-organizing neural pattern recognition machine," *Computer Vision, Graphics, and Image Processing*. 37, pp. 54-115, 1987.
29. G. A. Carpenter, "Default ARTMAP," in *Proc. of the International Joint Conference on Neural Networks (IJCNN'03)*, pp. 1396-1401, 2003.
30. A. Andoni and P. Indyk, "Near-Optimal Hashing Algorithms for Near Neighbor Problem in High Dimensions," in *Proceedings of the Symposium on Foundations of Computer Science*, 2006.
31. E. Kandel, J. Schwartz, and T. Jessell, *Principles of Neural Science*, 4th ed., McGraw-Hill Medical, New York, N.Y., 2000.
32. R. Eckhorn, R. Bauer, W. Jordan, M. Brosch, M. Kruse, W. Munk, and H. J. Reitboeck, "Coherent Oscillations: A Mechanism of Feature Linking in the Visual Cortex?" *Biological Cybernetics* 60: 121-130, 1988.
33. C. M. Gray, P. Konig, A. K. Engel, and W. Singer, "Oscillatory Responses in Cat Visual Cortex Exhibit Intercolumnar Synchronization Which Reflects Global Stimulus Properties," *Nature* 338: 334-336, 1989.

(2) Principal Aspects

The present invention has three "principal" aspects. The first is a vision system for object recognition. The vision system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of the vision system of the present invention is provided in FIG. 1. The vision system 100 comprises an input 102 for receiving information from at least one sensor for use in detecting an object a scene. Note that the input 102 may include multiple "ports." Typically, input is received from at least one sensor, non-limiting examples of which include video image sensors and still image sensors (such as cameras). An output 104 is connected with the processor for providing information regarding the presence and/or identity of object(s) in the scene to other systems in order that a network of computer systems may serve as an image processing system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
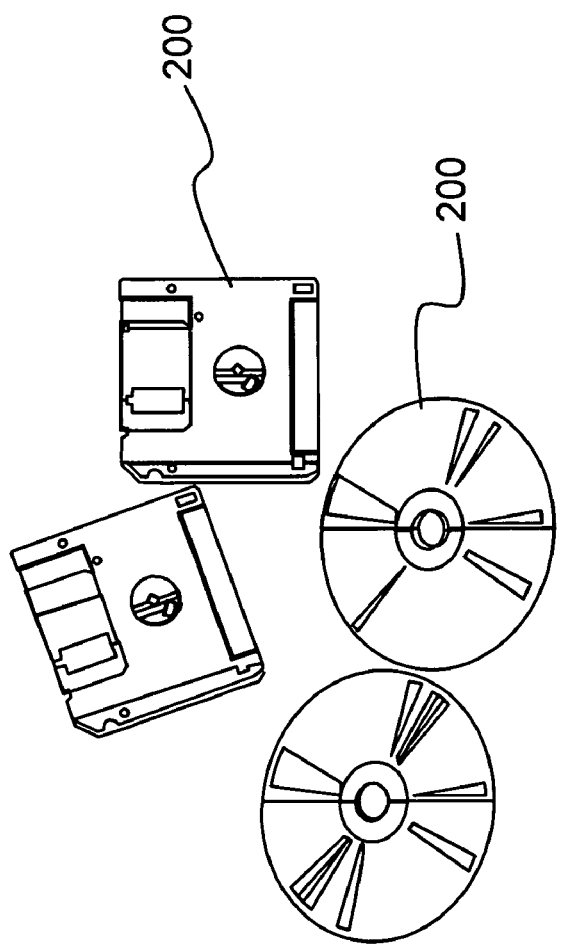
FIG. 2 is a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

(3) Introduction

The present invention is a bio-inspired vision system that can (1) learn representations of objects that are invariant to scale, position, and orientation; and (2) recognize and locate these objects in static and video imagery. The bio-inspired algorithms are based on models of human visual attention, search, recognition, and learning. The system uses modularized bio-inspired algorithms/techniques that can be applied to finding objects in a scene, attempting to recognize those objects, and prompting the user for additional information to facilitate online learning. All of this is performed in a real-time manner. This system supports online learning, meaning that the system can be updated with new information seamlessly without extensive retraining on all the data it has been trained on previously. The implementation is highly modular, and the modules can be used as a complete system or independently. Each of these modules is construed from existing technologies, each of which cannot solve the vision problem alone and suffers from numerous limitations. These limitations are eliminated through the complementary interactions between the modules and when appropriately combined they form an effective computer vision system. The underlying technologies were carefully researched in order to ensure that they were fast, robust, and could be integrated into an online system.

(4) Details of the Invention

Figure 3:
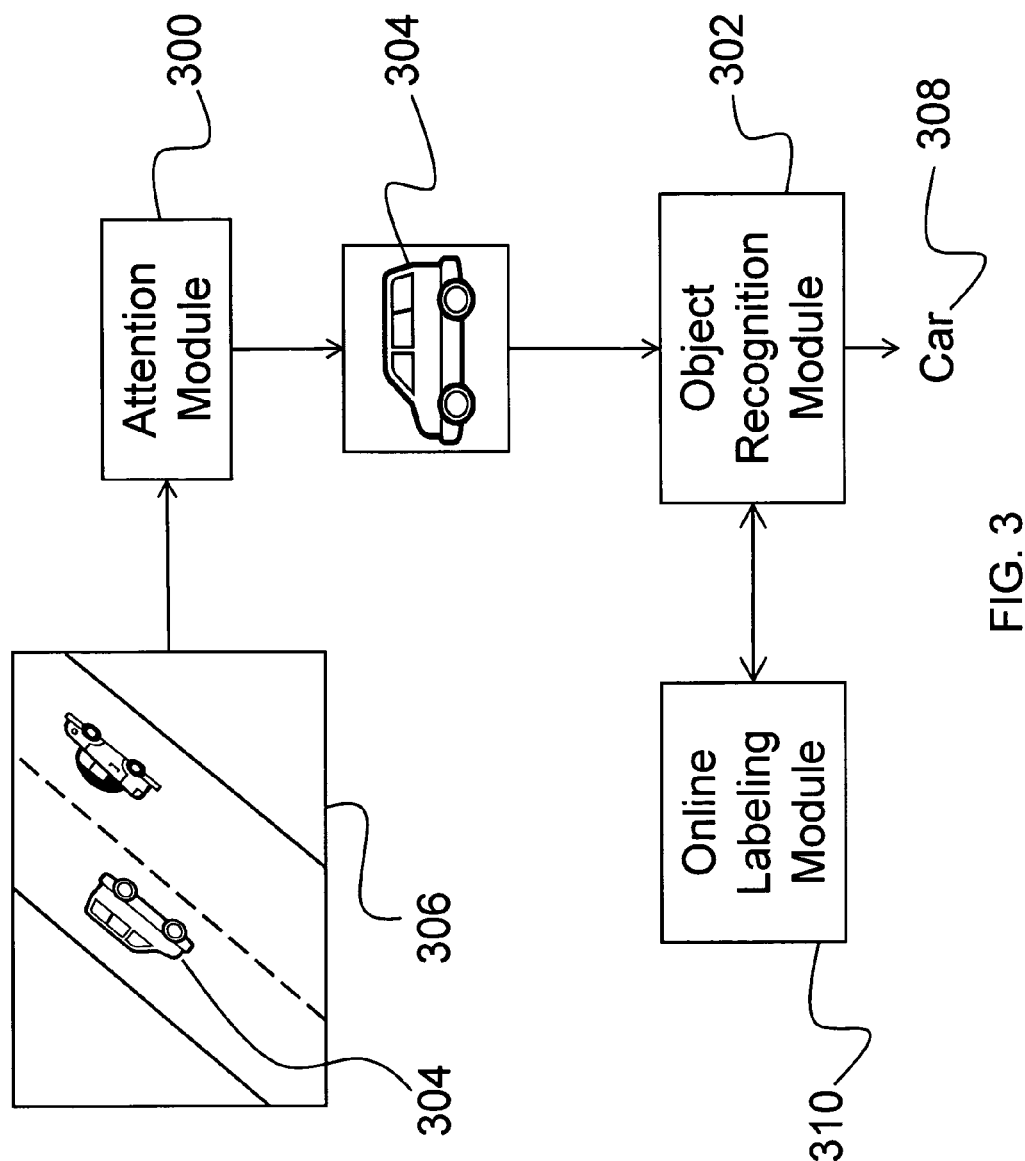
FIG. 3 is a schematic flow chart of the primary modules according to the present invention.

As shown in FIG. 3, the Visual Attention and Object Recognition System (VARS) is primarily composed of two encapsulated modules: Attention module 300 and Object Recognition module 302. Each of these modules is a stand-alone entity that could potentially be integrated into a separate system. The Attention module 300 finds objects 304 in a scene 306 in the order of their salience and segments them from the scene 306. Then, the Object Recognition module 302 attempts to classify each object 304 in order to output a classification 308. If the Object Recognition Module 302 is not sure of the object's classification, the system can be optionally configured to ask the user about the name of the object through use of an Online Labeling Module 310. In other words, when the Object Recognition Module 302 does not classify its input with sufficient confidence, VARS can optionally prompt the operator to intervene and enter a new label for the object. The Online Labeling Module 310 can optionally be turned off, so that the system can run in a fully autonomous manner. Thus, the system can be viewed as an incremental learning system where no offline training is required. The user can be integrated into the loop, but due to the semi-supervised nature of the underlying algorithms, only significant variations, not all false alarms, are shown to the user. Finally, the system does not forget the past, even with new learning.

(4.1) Attention Module

Input to the Attention Module 300 is any suitable input that includes a representation of an object in a scene. As a non-limiting example, the input is in the form of static color images. If black and white images are presented as input to the module, they are converted to an RGB color format (although they are still black and white images).

Using the images, the Attention Module 300 locates objects 304 in a scene 306 in order to segment the objects 304 from the scene 306. The present invention utilizes an object-based visual saliency model. An object-based approach is chosen that is invariant under both rotation and translation of the scene 306, and eschews the spotlight model of saliency in favor of a more pragmatic, object-based approach, which attends to each object 304 only once. Object-based saliency is also supported by a number of findings in neuroscience, such as the "selective looking" experiment (see literature reference no. 15).

The present invention uses an upgraded and improved version of the visual attention algorithm described by Orabona et al., which employs an object-based model of visual attention (see literature reference no. 16). For example, Orabona et al. primarily use color features to segment objects and compute saliency. The present invention adds intensity information in the feature set and handles it separately from color. The present invention also computes five features from fully-saturated color channels as opposed to just three in Orabona et al.'s work.

Figure 4:
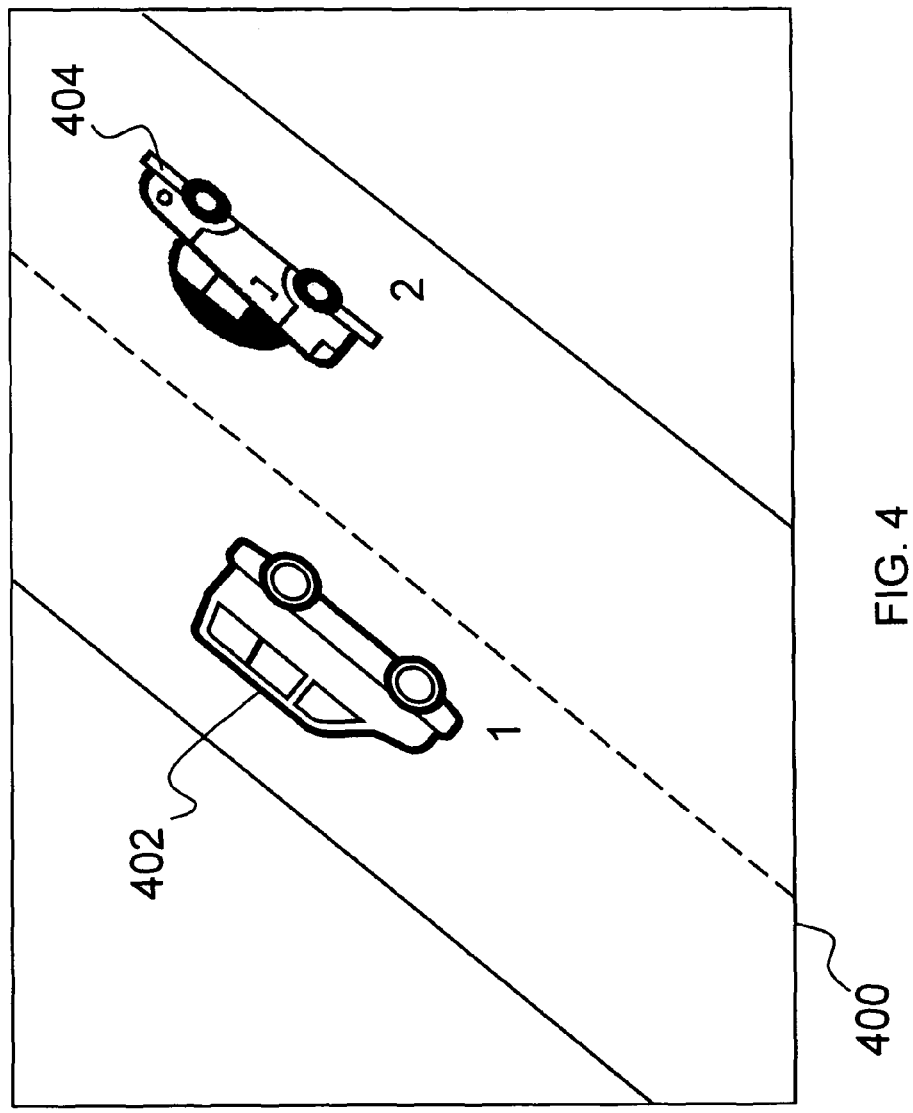
FIG. 4 is an illustration of a image that includes a scene with a first car and a second car.

The Attention Module 300 uses the gradient information from the features of a scene to segment it into a series of "proto-objects," whose boundaries are defined by common features between immediate regions. The Attention Module 300 also uses color and intensity information contained within an image to compute the saliency of a given proto-object, which is defined as a function of contrast between its features and those of its immediate surroundings; the objects are then "ranked" according to their salience in the image. This can be performed in a top-down manner, in which specific feature cues are used so that objects containing that feature draw more attention, or in a bottom-up mode, where no such cues are used. Top-down analysis can allow the system to process scenes faster, if such cues are available. For example, if one wishes to tune the system to detect red cars in a given scene, it will use this information to make red objects more salient than if bottom-up mode were used. As shown in FIG. 4, two objects were found by the Attention Module (illustrated as element 300 in FIG. 3) using an example of an image. FIG. 4 is an illustration of a static state image 400 that includes a scene with a first car 402 and a second car 404. Although for purposes of patent office procedure the drawings are depicted as black and white, one can imagine the image 400 as being an actual color image where the first car 402 is red and the second car 404 is another color, such as white. Thus, in this example, the red car (i.e., first car 402) would have a higher saliency than the white car (i.e., the second car 404).

The Attention System can analyze an image to determine which regions are salient without analyzing the content of the image. However, the Attention System cannot determine what is observed, and the features the Attention System extracts are not sufficient for reliable object recognition. These limitations are alleviated by the Object Recognition Module 302, which receives the segmented object from the Attention Module 300.

(4.1.1) Implementation of the Attention Module

As mentioned above, input to the Attention Module 300 is in the form of static color images. If black and white images are presented as input to the module, they are converted to an RGB color format (although they are still black and white images). Two intensity channels, L and D (light and dark), are calculated from the input image by averaging the red (r), green (g), and blue (b) channels: L=(r+g+b)/3 and D=255−L. Four fully-saturated color channels are created (red (R), green (G), blue (B), and yellow (Y)) that yield zero-response to white, effectively separating the effects of the color and intensity channels:

$$R = r - \frac{(g+b)}{2}, G = g - \frac{(r+b)}{2},$$

$$B = B - \frac{(r+g)}{2}, \text{ and } Y = \frac{(r+g)}{2} - \frac{|r-g|}{2} - b.$$

All negative values are thresholded at zero. Feature opponency maps corresponding to the receptive fields in the retina for red-center/green surround, green-center/red-surround, blue-center/yellow-surround, bright-center/dark-surround, and dark-center/bright-surround are computed from the input channels from the Difference of Gaussians (DoG) between an "ON" center feature, and a contrasting "OFF" surround feature. Both the center and surround channels are convolved with a two-dimensional Gaussian kernel, where the surround kernel has larger bandwidth than the center kernel. Each opponent feature map is computed when the surround channel is subtracted from the center channel. This process is repeated for each center-surround channel pairing.

The gradient information of each opponency map is computed by convolving it with a filter (such as a Sobel filter), which extracts the edge information from each map. A master edge map, E, is computed by representing each pixel (x,y) by its maximum value across all of the edge maps in a winner-take-all fashion often exhibited by neural cells:

$$E(x,y)=\max\{E_{RG}(x,y),E_{GR}(x,y),E_{BY}(x,y),E_{LD}(x,y),E_{DL}(x,y)\}.$$

The master edge map is processed by a watershed algorithm, which completes the boundaries and closes the contours provided by the edge map and represents these regions as segmented proto-objects. According to research (see literature reference nos. 32 and 33), the phase differences between neighboring visual cortical neurons are believed to contribute to the segmentation of objects in a scene and perceptual grouping of "blobs." The watershed transform simulates these activities. Figure-ground separation is achieved by tagging those watershed regions that occupy a disproportionately large region of the image space as "background" and all others as foreground proto-objects. Segmented proto-objects that only occupy a small fraction of the scene (e.g., <2%) are discounted as noise.

Once the scene has been segmented into a grouping of proto-objects, the saliency of each is computed and ranked relative to the other proto-objects in the image. For each, the local neighborhood is represented by a rectangular bounding box surrounding the object whose area is three times larger than the object. The bottom up saliency of a given proto-object is defined as:

$$S_{BU} = \sqrt{\sum_i (\Delta FEAT_i)^2},$$

where the contrast term $\Delta FEAT_i$ for the $i^{th}$ feature is computed as the difference between the average feature value within the object boundary and the average feature value outside of the object, but within the bounding box:

$$\Delta FEAT_i = \langle FEAT_i \rangle_{object} - \langle FEAT_i \rangle_{surround}.$$

The colors (R, G, B, and Y) and edge features (E) are described as equations above and are features or FEAT.

The proto-object regions are sorted from most to least salient, and the segmentation data is forwarded to the Object Recognition Module 302. Because each object can only be attended to once, the result is better than if an inhibition of return had been implemented on the most salient object.

(4.2) Object Recognition Module

The Object Recognition Module 302 supports interactive visual object learning and identification. Many of its sub-modules are functionally equivalent to brain structures in the "what" (ventral) stream, which is responsible for object recognition in a primate. It is designed to work on multi-spectral and grayscale images. As input, it expects an image that contains a single segmented object. The system may be used with an image that contains noise and has not had figure-ground separation performed, but this will prohibit the use of the optional What-and-Where filter and will likely decrease performance.

Figure 5:
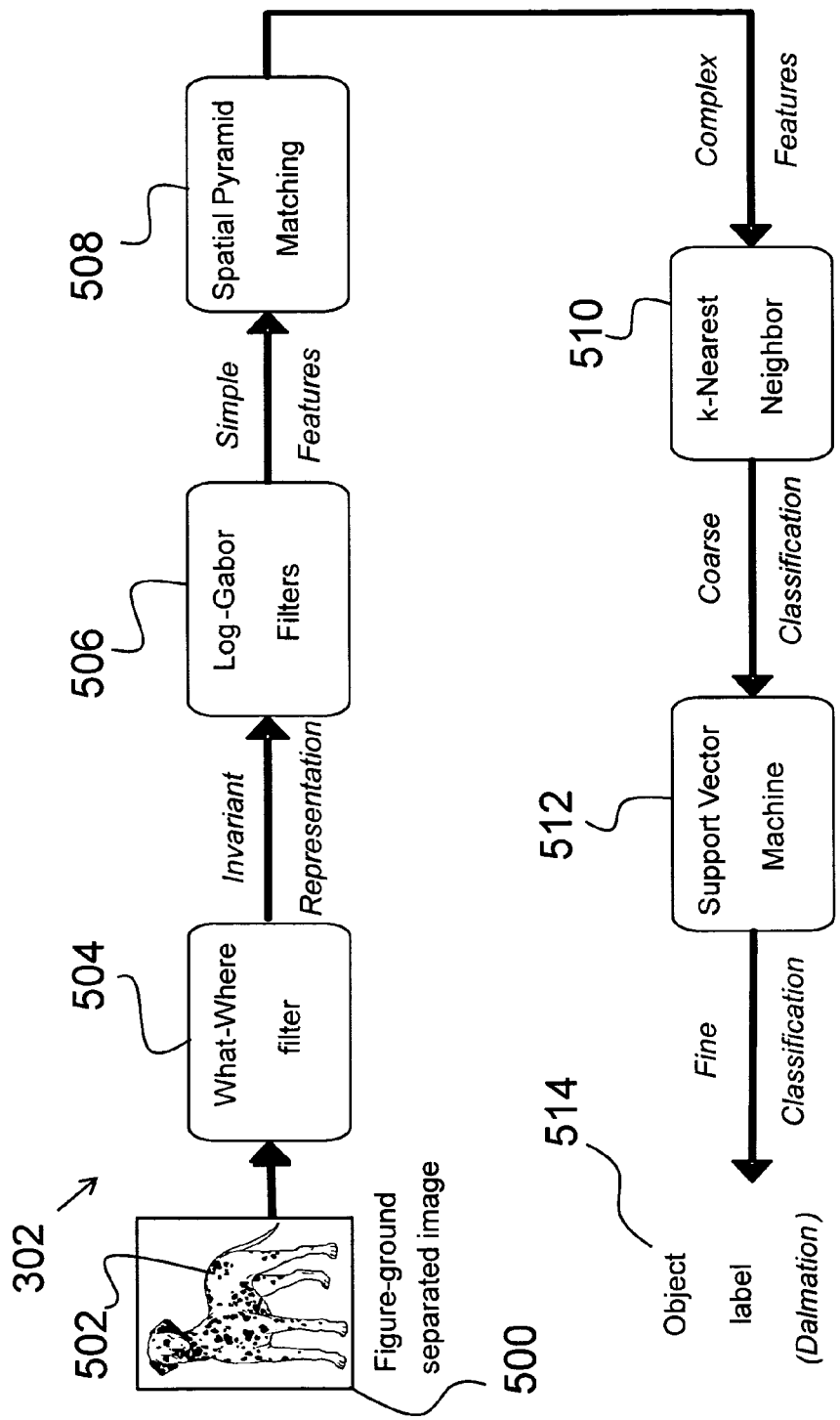
FIG. 5 is a schematic flow chart illustrating an Object Recognition Module according to the present invention.

FIG. 5 is a flowchart illustrating the Object Recognition Module 302. As shown in FIG. 5, the Object Recognition Module 302 performs object identification. It expects the Attention Module to provide it with an image 500 containing at least a single object 502 that has had figure-ground segmentation performed on it. The What-and-Where filter 504 rotates and rescales the object 502 to an invariant representation. A battery of shape filters 506 extracts simple shape features from the image 500, emulating the functionality of early visual cortex. The shape filters 506 are any suitable filter for extracting shape features from an image, a non-limiting example of which includes log-Gabor filters. The spatial pyramid matching algorithm 508 extracts higher level features from these simple features. The high-level features are used to perform coarse classification using a k-Nearest Neighbor 510 (KNN) technique followed by fine classification with a Support Vector Machine 512 (SVM). The SVM 512 outputs the fine classification or object label 514.

(4.2.1) Invariant Transformation

Most object recognition algorithms suffer from an inability to deal with more than minor variations in the scale and rotation of the object to be classified. The optional What-and-Where filter 504 may be used prior to feature extraction to alleviate this problem. A non-limiting example of a What-and-Where filter 504 was described by Carpenter et al. (see literature reference no. 17). Without it, the Object Recognition Module 302 can handle minor variations in scale, translation, and rotation. However, extreme variations will hinder its capacity to operate. If these variations are expected, then use of the What-and-Where filter 504 is prudent. It provides high performance translation, scale, and rotation invariance for figure-ground segmented objects. The segmentation does not necessarily have to be noise free. This filter appropriately centers, reorients, and rescales an object into an invariant representation. The serial What-and-Where Filter 504 algorithm is used in one embodiment of the present invention, although (and consistent with the scope of the invention) a different version may be beneficial in hardware that supports parallel processing.

Figure 6:
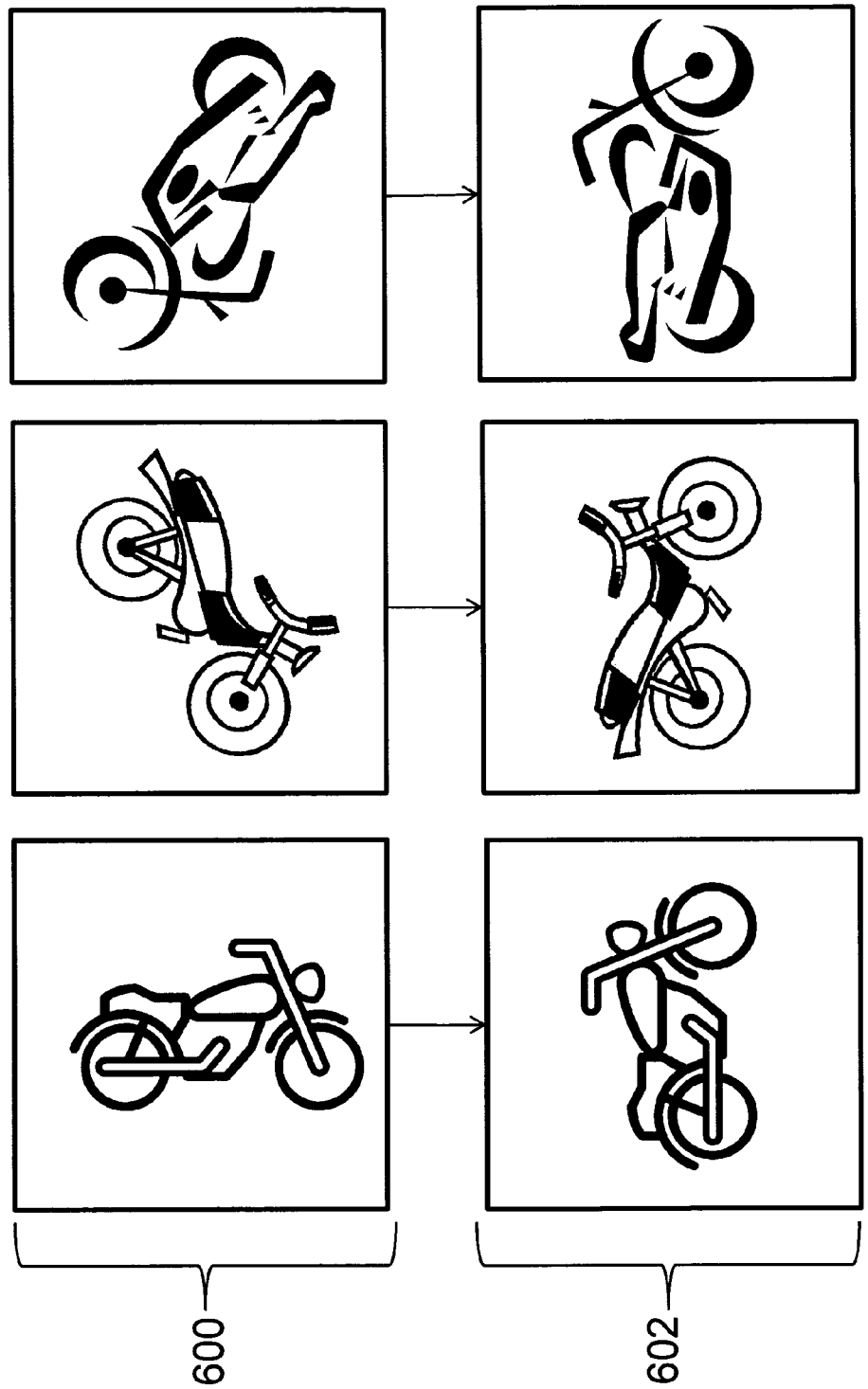
FIG. 6 is an illustration of segmented images before and after having passed through a What-and-Where filter.

FIG. 6 is an illustration of segmented images before and after having passed through the What-and-Where filter 504. As can be appreciated, the illustrations are depicted as drawings to comply with USPTO procedure. However, as can be appreciated by one skilled in the art, in practice, the present invention uses actual images. The top row 600 illustrates images that have been segmented from a dataset and that have been randomly rotated. The bottom row 602 presents the result of running each of the images in the top row 600 through the What-and-Where filter 504.

The What-and-Where filter 504 uses an algorithm that first calculates the position of the object within the input and centers it according to its center of mass. Then, it calculates the object's ideal rotation by generating a battery of receptive fields at a variety of orientations and scales. The filters compete with one another, and the winner dictates how the object is rotated. Using the now rotated object, a similar mechanism is used to resize the rotated object into an invariant size. One should refer to the original paper for further implementation details (see literature reference no. 17). The view-invariant representation is then further processed by the Object Recognition Module 302.

(4.2.2) Simple Shape Features

Although the present invention is not limited thereto, oriented Gabor filters (see literature reference nos. 7, 18, and 19) are a traditional choice for obtaining localized frequency information. The Gabor filters have been widely used to model the receptive fields of simple cells, which are found in primary visual cortex (V1). While popular, Gabor filters have two main limitations; the maximum bandwidth of a Gabor filter is limited to approximately one octave and is not optimal if one is seeking broad spectral information with maximal spatial localization. These problems can be eliminated through the use of the Log-Gabor function (see literature reference no. 18). The Log-Gabor filters can be constructed with arbitrary bandwidth and the bandwidth can be optimized to produce a filter with minimal spatial extent. For less than one octave, the shapes of Log-Gabor and Gabor functions are virtually identical. Additionally, Log-Gabor filters provide a better description of simple cell receptive fields found in V1. A bank of Log-Gabor filters can be used at different resolutions and orientations to extract a variety of simple shape features from the input, which have a functionality similar to V1 and V2.

The frequency response of a Log-Gabor filter is described by:

$$G(f) = \exp\left(-\frac{1}{2}\left(\log\left(\frac{f}{f_0}\right)\right)^2 \left(\log\left(\frac{\sigma}{f_0}\right)\right)^{-2}\right),$$

where $f_0$ is the filter's center frequency, $\sigma$ is the standard deviation of the Gaussian, and f is the filter's frequency. A two-dimensional (2D) filter can be constructed using this equation and applied to the image in Fourier space. The results are then converted back using a 2D inverse Fourier transform. These can be computed at various combinations of orientations and resolutions. Additionally, a non-limiting example of the Fourier transform is a fast Fourier transform.

Figure 7:
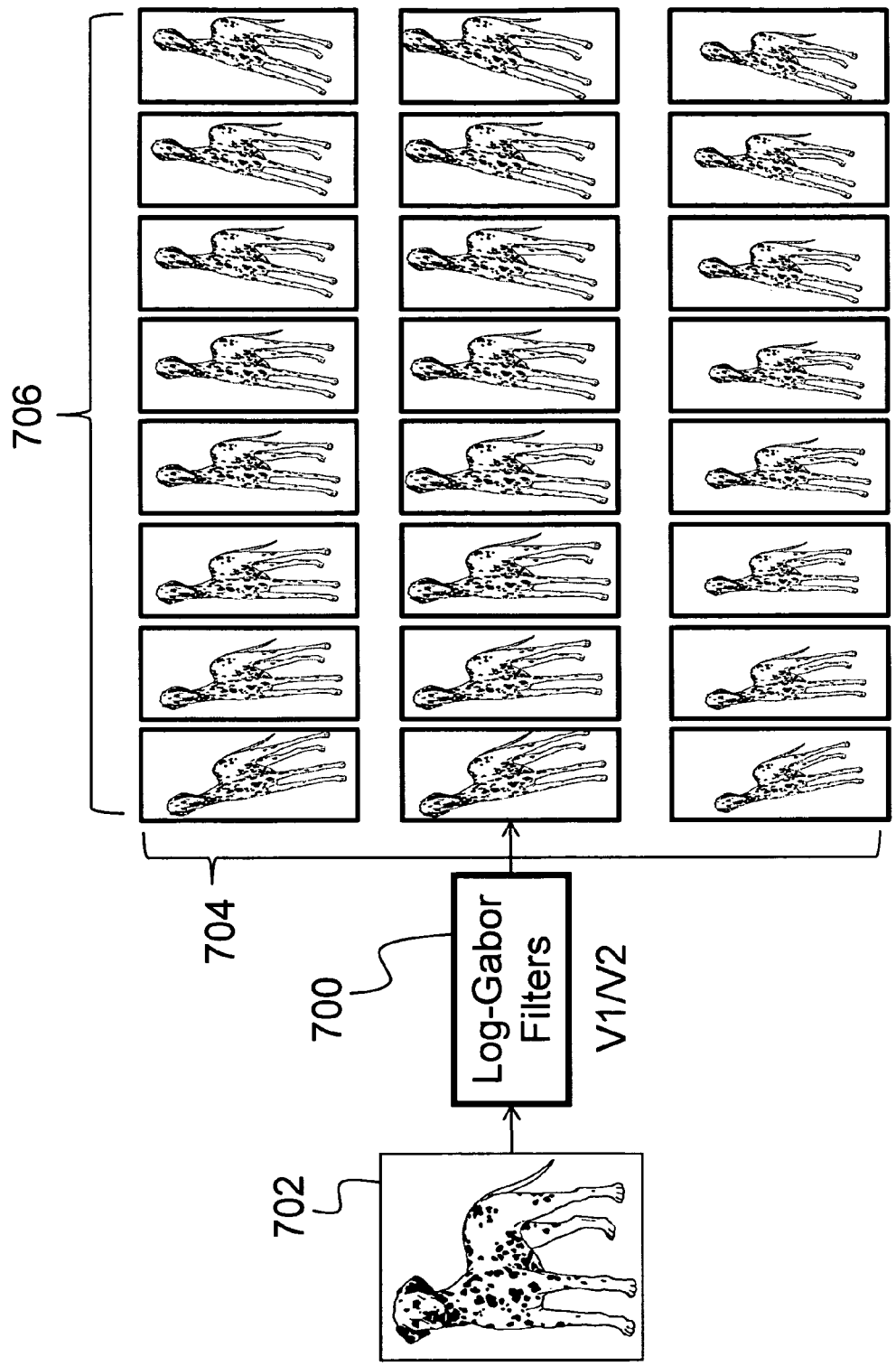
FIG. 7 is an illustration of a bank of filters being used on an image of a dog to extract shape features.

The Log-Gabor filter approximates the response of the visual receptive fields found in area V1 and V2 of a visual cortex. For example and as shown in FIG. 7, a bank of filters 700 is used on an image 702 of a Dalmatian to extract shape features at three scales 704 and eight orientations 706.

In order to extract shape features, multi-spectral images need to be converted to grayscale before being fed into the Log-Gabor filter bank. Any suitable image converter can be used; a non-limiting example of which includes Martin Faust's detail preserving color to grayscale transformation, which can be easily found online. In the experimental results detailed below, three scales and eight orientations were used, for a total of twenty four filters.

(4.2.3) Complex Shape Features

Using the output of the filter bank, feature combinations are extracted using any suitable spatial pyramid matching technique, a non-limiting example of which was described by Lazebnik et al. (see literature reference no. 3). This approach partitions the extracted Log-Gabor features into increasingly fine sub-regions and computes conjunctions of the features in each region using histograms. It has been hypothesized that constructing a histogram may approximate the function of the complex and hypercomplex cells found in the visual cortex. The inventors of the present application further hypothesize that it roughly corresponds to the function of V4 in a primate's visual cortex.

For each of the feature matrices provided by the Log-Gabor filter bank, appropriately weighted spatial histograms are created of features at different resolutions. The weight at a particular level is defined as:

$$w(l) = \begin{cases} \frac{1}{2^L}, & l = 0 \\ \frac{1}{2^{L-l+1}}, & l \neq 0 \end{cases},$$

where L is the maximum grid resolution used. $(4^{L+l}-1)/3$ features are extracted from each filter at levels zero to L. At each level $4^l$, features are extracted by splitting the matrix into l equal sized non-overlapping grids, summing the features in each grid together, and then weighting each sum by w(l). The features extracted from each filter are concatenated to form a single feature vector.

Assuming that the Log-Gabor filter bank uses M scales and N orientations, this long feature vector would contain $MN(4^{L+l}-1)/3$ elements. While this vector may have very high dimensionality, computation is still efficient because it is very sparse. L=4 was used in the experimental results described below.

(4.2.4) Coarse Classification: k-Nearest Neighbor

The classification system used is motivated by studies in visual psychophysics. In the amount of time it takes for an individual to perceive an object's presence, they will have already broadly categorized it although they are unable to provide an exact classification (see literature reference no. 20). For example, if an object is flashed for 50 milliseconds (ms), a person will usually detect and be able to coarsely categorize it. However, they are rarely capable of determining the precise category of the object within that time span; it usually takes an additional 50-100 ms before precise classification can be performed. Both fine and coarse categorization is thought to occur within the inferior temporal (IT) cortex (see literature reference no. 21). One of its sub-regions, the temporal-occipital (TEO) cortex is thought to be responsible for coarse classification (see literature reference no. 22).

To simulate the brain's ability to efficiently coarsely classify objects, a k-Nearest Neighbor (KNN) (see literature reference no. 23) variant is used to learn the data and perform coarse classification. This algorithm stores training examples and their labels. In one aspect, all the neighbors are found that are less than D distance from the input feature vector and store them in list Q. The Euclidean (L2) distance is used. Since this process is only performing coarse categorization, using a fast, but not necessarily ideal, distance function is appropriate for finding many neighbors.

When the system is in interactive learning mode, the user can be prompted for the correct label to learn the data if Q is empty. No more processing of this object is necessary. However, if interactive learning is not permitted, the closest K neighbors are found and stored in Q instead.

If greater than p percent of the vectors in Q are of the same class, then that class is ascribed to the input and processing is halted for this object, unless more than one class satisfied this condition. If the class of the object is still unknown, then fine class discrimination is applied to the members of Q in order to determine the appropriate class.

(4.2.5) Fine Classification: Support Vector Machine (SVM)

After course classification is performed, the system then performs a more fine classification using any suitable classification technique. For example, a SVM-based (see literature reference no. 5) approach can be used to perform precise classification of an object. This is functionally similar to the temporal (TE) cortex brain region (see literature reference no. 22), which performs fine-grained object classification slightly after the activation of the temporal occipital (TEO) (see literature reference no. 21). SVMs are a set of linear classification algorithms that minimize the classification error on training data as well as maximize the geometric margin between training examples. Thus, it is a maximum margin classifier. Typically a non-linear kernel is applied to the data in order to make it linearly separable in a higher dimensional space. However, since the extracted features are already of a very high dimension, the use of another kernel is not necessary. SVMs frequently outperform other classification algorithms. However, training them with a great deal of data can often be quite time-consuming. This is not a problem in the present invention because it uses a coarse-classifier that greatly prunes the number of training examples used with an SVM.

If Q is not empty, then an SVM is trained using the one-versus-all rule on the fly. This means that separate SVM classifiers are learned to separate each class from the others, and the input feature vector is assigned the label of the classifier with the best response. This method of performing fine-grained classification is quite efficient as long as D is appropriately chosen, because usually very few classes need to be discriminated using a small number of examples. In the experimental results described below, the SVM cost parameter c was set as high as possible and a linear kernel was used.

(4.2.6) Classification Functionality

The computer vision system (i.e., the Visual Attention and Object Recognition System (VARS)) can analyze scenes quickly and robustly. This architecture can find relevant objects in a scene, determine which objects are familiar, and then classify the objects appropriately or request the correct name for unfamiliar objects. Various systems have been proposed which may perform well on one or two of these tasks, but most fail to integrate the full functionality required of a visual scene analysis system.

Many machine vision systems are incapable of performing interactive learning and must be retrained if any new objects are to be learned. For example, suppose a system is trained to recognize the brand and flavor of soda cans. Training this system to distinguish between hundreds of brands and flavors may be very time consuming. After this system is trained, a new soda flavor comes onto the market. A system that cannot be trained interactively would need to relearn all of its past data in order to incorporate the new soda flavor. This is an inefficient waste of resources and an inelegant way to learn. In systems that permit interactive learning, the new flavor could be learned by incorporating the data about it without extensive retraining on all past knowledge. In an interactive system the user can be integrated into the loop, but due to the semi-supervised nature of the underlying algorithms, only significant variations, not all false alarms, are shown to the user. It does not forget the past even with new learning.

No good interactive SVM algorithm had been constructed prior to the present invention. By combining KNN and SVM, the present invention achieves fast and accurate classification. In the present invention, a hybrid nearest neighbor and SVM are used for classification. While the approach is inspired by a functional model of object recognition in the visual cortex, it does not model the neural networks directly. In an alternative implementation, an Adaptive Resonance Theory (ART) neural network based classification system (see literature reference no. 28) can be used. ART networks can perform very fast interactive learning that does not suffer from catastrophic "forgetting" when additional patterns are learned. ART neural networks provide real-time learning, search, and prediction. Although the SVM has been modified to accommodate interactive learning, conventional artificial intelligence (AI) and machine learning methods for pattern recognition usually cannot learn new patterns on the fly. They typically require retraining with all previous data and all new data in order to learn a new object. ART-based approaches address these limitations. Although several variations of ART have been spawned over different design constraints and application domains, they share a central neural computation called the ART matching rule. This rule clarifies the interaction between bottom-up inputs and top-down learned expectations. If these two representations resonate, old memories are changed minimally. However, a mismatch between the bottom-up and top-down representations triggers an arousal burst to create new memories. Recently, Default ARTMAP has emerged as a supervised ART network with simplicity of design and robust performance across many application domains (see literature reference no. 29). For example, one application of ART neural networks was used to organize over 100,000 parts, grouped into thousands of self-organized clusters that could be queried in a real-time manner (see literature reference no. 29). Despite these benefits, the ARTMAP networks developed to date have been unable to achieve the classification performance of SVM. Some preliminary experiments were conducted using Default ARTMAP instead of the classifier of the present invention, however, it did not demonstrate comparable results.

When the present invention is learning, the extracted feature vectors and their ascribed classes are stored for use with the KNN classifier. Data can be continually added to the system's knowledge base and no explicit training is necessary, which permits them to be learned in constant time. As the number of learned examples increases, it may be desirable to use a technique to condense the examples by eliminating those that do not affect classification accuracy or using one of the many techniques to significantly speed up KNN, such as Locality Sensitive Hashing (LSH) (see literature reference no. 30).

(4.3) Online Labeling Module

The Online Labeling Module 310 is an optional module that is used to classify an object if the object is unrecognized by the Object Recognition Module 302. In other words, when the Object Recognition Module 302 does not classify its input with sufficient confidence, VARS can optionally prompt the operator to intervene and enter new a label for the object. The Online Labeling Module 310 can optionally be turned off, so that the system can run in a fully autonomous manner.

(5) Experimental Results

Figure 8:
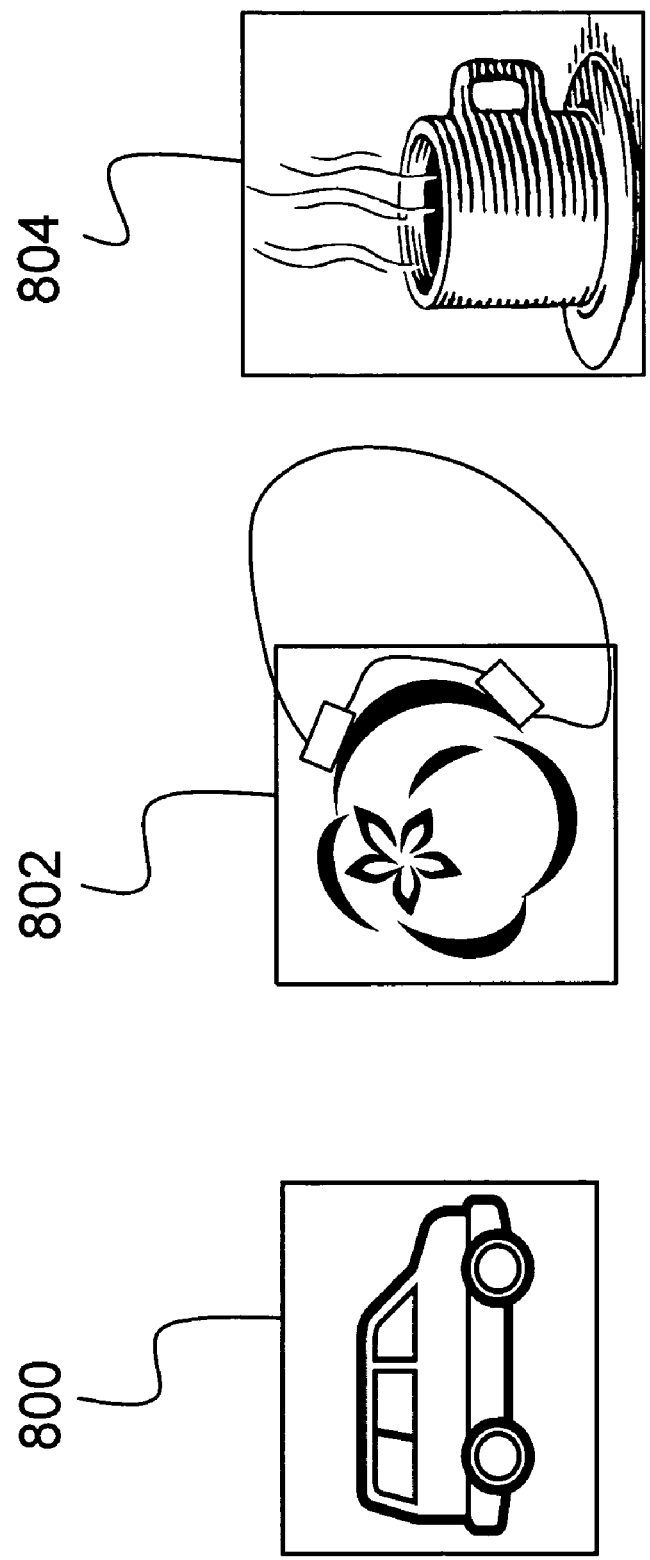
FIG. 8 is an illustration of images that include single objects.

As can be appreciated by one skilled in the art, the experimental results herein are provided for illustrative purposes only to demonstrate the operability of the present invention and the invention is not intended to be limited thereto. The experiment was conducted using a Columbia Object Image Library (COIL)-100 dataset (see literature reference no. 24) that contained 100 object classes, each of which contained 72 images of the same object rotated at five degree intervals. This was an excellent dataset for demonstrating the efficacy of the present invention. Two different test studies were performed using the COIL-100 dataset. In the first study, only the Object Recognition Module 302 was used on each object in the dataset. For example and as shown in FIG. 8, images including objects such as a car 800, a tomato 802, and a coffee cup 804 were run through the Object Recognition Module 302. In the second study, artificial scenes were created that were composed of a variable number of COIL-100 objects with different size, location and orientation parameters. The scenes were then run through the entire VARS system according to the present invention.

(5.1) Scenes with a Single Object

To compare the performance of the Object Recognition Module 302 on this dataset to other approaches, the same training and testing paradigm was adopted as was used by Roobaert and Van Hulle (see literature reference no. 25). Their system used shape features and a SVM classifier. They trained their system using four views per COIL-100 object and tested using the remaining 68 views. They achieved 74.6 percent accuracy using their approach. They compared their results to a simple Nearest Neighbor Classifier (NNC) using a Euclidian distance measure and a method devised by Murase and Nayer (see literature reference no. 26). The NNC achieved 77.0 percent accuracy and the Murase and Nayer system achieved 70.1 percent accuracy.

In the experiment according to the present invention, the training and testing setup was replicated by disabling both the attention and interactive learning functionality of the module. The What-and-Where filter 504 was not used. The system was trained on COIL-100 objects rotated at 0, 90, 180, and 270 degrees on their z-axis. The system achieved 77.4 percent accuracy, which is higher than other known results. On this dataset it is difficult to perform significantly better using shape features because many of the objects have identical shapes. Incorporating color descriptors into the system could possibly produce better results.

(5.2) Scenes with Multiple Objects

To evaluate the functionality of VARS in its entirety, the system was first trained exactly as it was in section 5.1, except eight training examples per class were used instead of four. Twenty scenes were then created that contained a variable number (typically 3-7) of COIL-100 objects at random locations and orientations on the z-axis against a black background. None of the objects occluded each other. Neither the interactive learning features nor the What-and-Where filter 504 were used in this process. VARS successfully found all 94 objects in the scenes and achieved 95.75 percent recognition accuracy.

Figure 9:
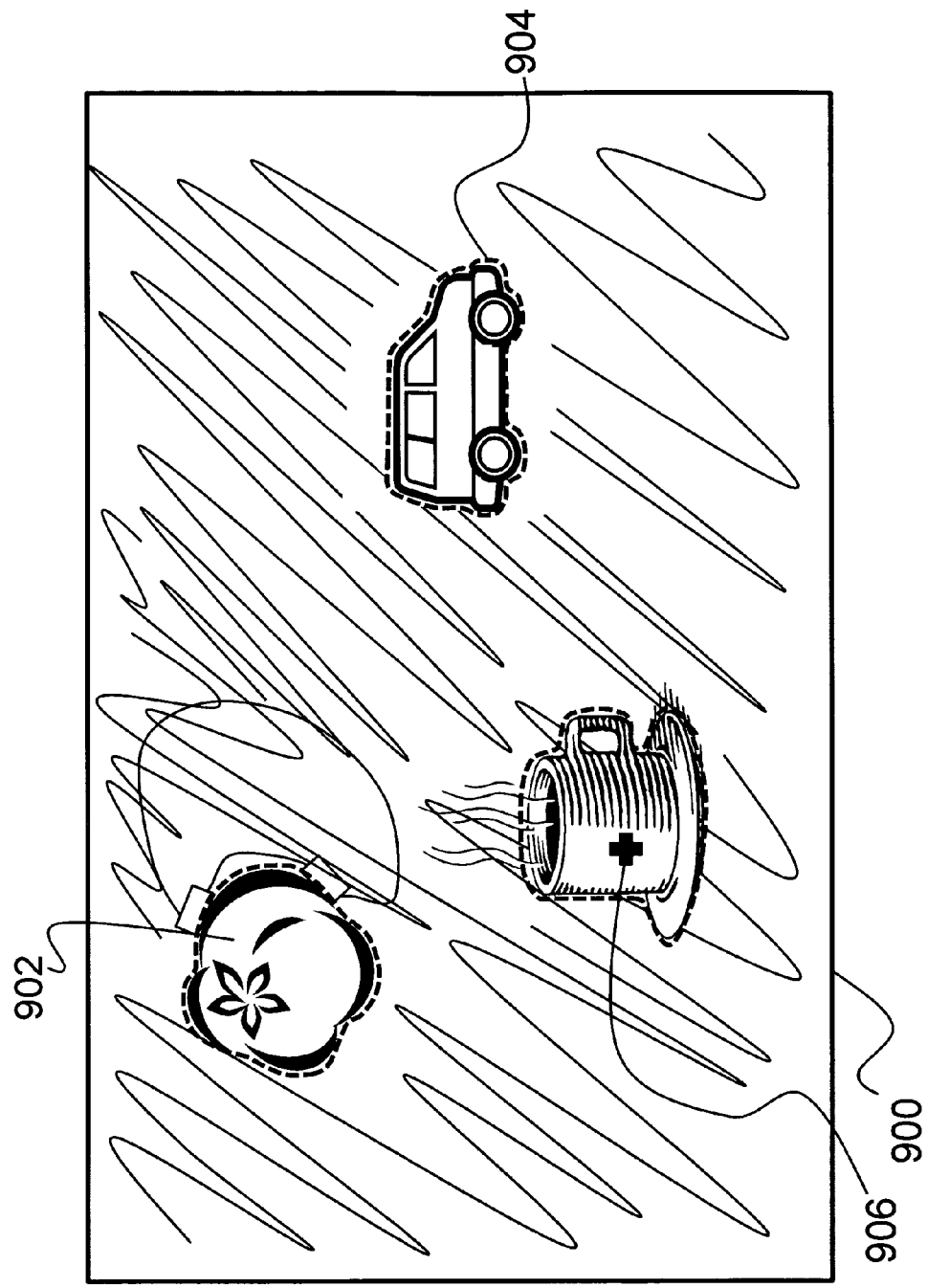
FIG. 9 is an illustration of an example of a scene that was created with multiple objects.

FIG. 9 illustrates an example of a scene 900 that was created with multiple COIL-100 objects 902. As can be appreciated, although black and white drawings are illustrated, the actual scene that was created includes real (actual) images of the COIL-100 objects. The attention algorithm of the present invention locates and segments each of the objects 902. The boundaries 904 it found are represented, in this illustration, by a dashed outline. The plus-mark 906 indicates the most salient object in the scene 900.

(5.3) Caltech-101 Dataset

The Object Recognition Module 302 was also tested using the Caltech-101 dataset as described by Fei-Fei et al. (see literature reference no. 1). The Caltech-101 dataset contains 101 object categories, each of which has around 40 to 800 images. A similar testing and training method was adopted for most other groups using this dataset. The system was trained using fifteen random images per category and then tested on fifty other randomly chosen images in each category. If fewer than fifty images were available for a particular category, then the system was tested on all remaining images. The results were then normalized by calculating the mean performance per category. Both training and test images were figure-ground segmented. The background class was not included because it is not intended for object recognition or the faces class, since it is redundant with the faces class. Using this paradigm, the system achieved 61.76 percent accuracy. Some of the per-class results are presented in FIG. 10. FIG. 10 is a table 1000 showing the top ten best classified classes using the Caltech-101 dataset when trained with fifteen images per class. The table 1000 illustrates the classes (i.e., categories 1002) and their corresponding accuracy 1004.

As illustrated, the results are quite good on average and for classes in which shape is a good discriminatory feature. However, the present invention did not perform well for some classes such as a wild cat (28 percent), a starfish (28 percent), and a headphone (16 percent). Achieving good performance on these classes would likely require more training examples and/or the integration of other features such as color or texture.

(6) Conclusion

The present invention is a modular system for integrating attention, object recognition, and interactive learning. The system achieves excellent performance on a variety of challenging visual tasks with low computational times. The system includes an Attention Module 300, an Object Recognition Module 302, and an Online Labeling Module 310. The Attention Module 300 is configured to receive an image representing a scene and find and extract an object from the image. The Attention Module 300 also generates feature vectors corresponding to color, intensity, and orientation information within the extracted object. The Object Recognition Module 302 receives the extracted object and the feature vectors and associates a label with the extracted object. The Online Labeling Module 310 is configured to alert a user if the extracted object is an unknown object so that it can be labeled and thereby classified.

What is claimed is:

1. A vision system for object recognition, comprising:
one or more processors and a memory, the memory having instructions encoded thereon to include:
an attention module configured to receive an image representing a scene with an object in the scene and find and extract the object from the image as an extracted object, the attention module also being configured to generate feature vectors corresponding to color, intensity, and orientation information within the extracted object; and
an object recognition module configured to receive the extracted object and the feature vectors and associate a label with the extracted object to classify the object, whereby a user can use the vision system to classify an object in a scene; and
wherein the attention module is further configured to:
receive an image that includes a representation of an object in a scene, the image having color features;
determine light and dark intensity channels from the color features;
create four fully-saturated color channels from the color features;
compute feature opponency maps from the light and dark intensity channels and the four fully-saturated color channels;
compute an edge map for each opponency map;
segment the scene into a series of "proto-objects" based on the edge maps, where boundaries of the proto-objects are defined by common features between immediate regions within the image;
compute a saliency of a given proto-object using color and intensity information contained within the image;
rank the proto-objects according to saliency;
designate the proto-object with the highest saliency as the object to be extracted from the image; and
extract the object from the image.

2. A vision system as set forth in claim 1, wherein the object recognition module is further configured to:
reformat the object to an invariant representation;
extract simple shape features from the image;
extract high-level features from the simple shape features;
perform a coarse classification;
perform a fine classification to generate an object label; and
output the object label.

3. A vision system for object recognition, comprising:
one or more processors and a memory, the memory having instructions encoded thereon to include:
an attention module configured to receive an image representing a scene with an object in the scene and find and extract the object from the image as an extracted object, the attention module also being configured to generate feature vectors corresponding to color, intensity, and orientation information within the extracted object; and
an object recognition module configured to receive the extracted object and the feature vectors and associate a label with the extracted object to classify the object, whereby a user can use the vision system to classify an object in a scene;
wherein the object recognition module is further configured to:
rotate and rescale the object to an invariant representation utilizing a filter;
extract simple shape features from the image utilizing a Log-Gabor filter;
extract high-level features from the simple shape features utilizing a spatial pyramid matching technique;
perform a coarse classification utilizing a k-Nearest Neighbor technique;
perform a fine classification to generate an object label utilizing a Support Vector Machine; and
output the object label.

4. A computer program product for recognizing an object, the computer program product comprising computer-readable instruction means stored on a non-transitory computer-readable medium that are executable by a computer for causing the computer to:
receive an image representing a scene with an object in the scene;
find and extract the object from the image as an extracted object;
generate feature vectors corresponding to color intensity, and orientation information within the extracted object;
associate a label with the extracted object to classify the object, whereby a user can use the computer to classify an object in a scene;
receive an image that includes a representation of an object in a scene, the image having color features;
determine light and dark intensity channels from the color features;
create four fully-saturated color channels from the color features;
compute feature opponency maps from the light and dark intensity channels and the four fully-saturated color channels;
compute an edge map for each opponency map;
segment the scene into a series of "proto-objects" based on the edge maps, where boundaries of the prow-objects are defined by common features between immediate regions within the image;
compute a saliency of a given proto-object using color and intensity information contained within the image;
rank the proto-objects according to saliency;
designate the proto-object with the highest saliency as the object to be extracted from the image; and
extract the object from the image.

5. A computer program product as set forth in claim 4, further comprising instruction means for causing the computer to:
reformat the object to an invariant representation;
extract simple shape features from the image;
extract high-level features from the simple shape features;
perform a coarse classification;
perform a fine classification to generate an object label; and
output the object label.

6. A computer program product for recognizing an object, the computer program product comprising computer-readable instruction means stored on a non-transitory computer-readable medium that are executable by a computer for causing the computer to:
  receive an image representing a scene with an object in the scene;
  find and extract the object from the image as an extracted object;
  generate feature vectors corresponding to color, intensity, and orientation information within the extracted object;
  associate a label with the extracted object to classify the object, whereby a user can use the computer to classify an object in a scene;
  rotate and rescale the object to an invariant representation utilizing a filter;
  extract simple shape features from the image utilizing a Log-Gabor filter;
  extract high-level features from the simple shape features utilizing a spatial pyramid matching technique;
  perform a coarse classification utilizing a k-Nearest Neighbor technique;
  perform a fine classification to generate an object label utilizing a Support Vector Machine; and
  output the object label.

7. A method for recognizing an object, the method comprising acts of:
  receiving an image representing a scene with an object in the scene;
  finding and extracting the object from the image as an extracted object;
  generating feature vectors corresponding to color, intensity, and orientation information within the extracted object; and
  associating a label with the extracted object to classify the object, whereby a user can use the computer to classify an object in a scene;
  receiving an image that includes a representation of an object in a scene, the image having color features;
  determining light and dark intensity channels from the color features;
  creating four fully-saturated color channels from the color features;
  computing feature opponency maps from the light and dark intensity channels and the four fully-saturated color channels;
  computing an edge map for each opponency map;
  segmenting the scene into a series of "proto-objects" based on the edge maps, where boundaries of the proto-objects are defined by common features between immediate regions within the image;
  computing a saliency of a given proto-object using color and intensity information contained within the image;
  ranking the proto-objects according to saliency;
  designating the proto-object with the highest saliency as the object to be extracted from the image; and
  extracting the object from the image.

8. A method as set forth in claim 7, further comprising acts of
  reformatting the object to an invariant representation;
  extracting simple shape features from the image;
  extracting high-level features from the simple shape features;
  performing a coarse classification;
  performing a fine classification to generate an object label; and
  outputting the object label.

9. A method for recognizing an object, the method comprising acts of:
  receiving an image representing a scene with an object in the scene;
  finding and extracting the object from the image as an extracted object;
  generating feature vectors corresponding to color, intensity, and orientation information within the extracted object; and
  associating a label with the extracted object to classify the object, whereby a user can use the computer to classify an object in a scene;
  rotating and resealing the object to an invariant representation utilizing a filter;
  extracting simple shape features from the image utilizing a Log-Gabor filter;
  extracting high-level features from the simple shape features utilizing a spatial pyramid matching technique;
  performing a coarse classification utilizing a k-Nearest Neighbor technique;
  performing a fine classification to generate an object label utilizing a Support Vector Machine; and
  outputting the object label.

* * * * *